US009547176B2

(12) United States Patent
Lissotschenko et al.

(10) Patent No.: US 9,547,176 B2
(45) Date of Patent: Jan. 17, 2017

(54) DEVICE FOR GENERATING LASER RADIATION HAVING A LINEAR INTENSITY DISTRIBUTION

(71) Applicant: LIMO Patentverwaltung GmbH & Co KG, Dortmund (DE)

(72) Inventors: Vitalij Lissotschenko, Froendenberg (DE); Paul Alexander Harten, Essen (DE)

(73) Assignee: LIMO PATENTVERWALTUNG GMBH & Co. KG, Bookenburgweg (DE)

( * ) Notice: Subject to any disclaimer, the term of this patent is extended or adjusted under 35 U.S.C. 154(b) by 0 days.

(21) Appl. No.: 14/782,239

(22) PCT Filed: Mar. 13, 2014

(86) PCT No.: PCT/EP2014/055029
§ 371 (c)(1),
(2) Date: Oct. 2, 2015

(87) PCT Pub. No.: WO2014/161710
PCT Pub. Date: Oct. 9, 2014

(65) Prior Publication Data
US 2016/0041397 A1  Feb. 11, 2016

(30) Foreign Application Priority Data

Apr. 5, 2013  (DE) .......................... 10 2013 103 422

(51) Int. Cl.
*G02B 27/09* (2006.01)
*B23K 26/073* (2006.01)
(Continued)

(52) U.S. Cl.
CPC ....... *G02B 27/0927* (2013.01); *B23K 26/0617* (2013.01); *B23K 26/0648* (2013.01);
(Continued)

(58) Field of Classification Search
CPC ........................ G02B 27/0927; B23K 26/0738
See application file for complete search history.

(56) References Cited

U.S. PATENT DOCUMENTS 6,310,717 B1 * 10/2001 Naganuma .............. H01S 3/067
359/341.1
2003/0089691 A1   5/2003 Tanaka
(Continued)

FOREIGN PATENT DOCUMENTS

CN       1441467 A       9/2003
CN       1925109 A       3/2007
(Continued)

OTHER PUBLICATIONS

Homburg, O. and T. Mitra: "Gaussian-to-Top-Hat-Beam Shaping: An overview of Parameters, Methods and Applications," Laser Resonators, Microresonators, and Beam Control XIV, SPIE, Feb. 9, 2012 p. 1-9.
(Continued)

*Primary Examiner* — Omar R Rojas
(74) *Attorney, Agent, or Firm* — Cohen & Hildebrand, PLLC

(57) ABSTRACT

The invention relates to a device for generating laser radiation (3) having a linear intensity distribution (11), comprising a plurality of laser light sources for generating laser radiation (3) and optical means for transforming laser radiation (3) exiting from the laser light sources into laser radiation (14) that has a linear intensity distribution (11) in a working plane (9), wherein the laser light sources are constructed as fundamental mode lasers and the device is designed such that each of the laser beams (3) exiting from the laser light sources does not overlap with itself.

16 Claims, 2 Drawing Sheets

(51) Int. Cl.
  *B23K 26/06* (2014.01)
  *H01S 3/00* (2006.01)
  *H01S 3/067* (2006.01)

(52) U.S. Cl.
  CPC ...... *B23K 26/0738* (2013.01); *G02B 27/0955* (2013.01); *G02B 27/0961* (2013.01); *H01S 3/0071* (2013.01); *H01S 3/06704* (2013.01); *H01S 3/06708* (2013.01)

(56) References Cited

U.S. PATENT DOCUMENTS

| | | |
|---|---|---|
| 2005/0111339 A1 | 5/2005 | Tanaka |
| 2007/0054443 A1* | 3/2007 | Shimomura ......... B23K 26/067 438/149 |
| 2007/0295974 A1 | 12/2007 | Fontanella |
| 2011/0110626 A1 | 5/2011 | Aschke et al. |
| 2012/0127723 A1 | 5/2012 | Mikhailov et al. |
| 2013/0056450 A1 | 3/2013 | Lissotschenko et al. |

FOREIGN PATENT DOCUMENTS

| | | |
|---|---|---|
| CN | 102081234 A | 6/2011 |
| CN | 102395914 A | 3/2012 |
| CN | 102844143 A | 12/2012 |
| CN | 102859676 A | 1/2013 |
| DE | 10 2007 001 639 | 4/2008 |

OTHER PUBLICATIONS

White Paper, Efficient Transformation of Gaussian Beams into Uniform, Rectangular Intensity Distriubutions, Retrieved from Internet at : :http://www.coherent.de/fileadmin/redakteur/pdf/LMC_pdf/Structured_Light_WP_Final_June_2011.pdf.
International Search Report of PCT/EP2014/055029 (WO 2014/161710) of Jun. 16, 2014.
Chinese Office of corresponding Application 201480019543.6 Action, dated Sep. 19, 2016.

* cited by examiner

//DEVICE FOR GENERATING LASER RADIATION HAVING A LINEAR INTENSITY DISTRIBUTION

This is an application filed under 35 USC §371 of PCT/EP2014/055029 filed on Mar. 13, 2014 claiming priority to DE 10 2013 103 422.5 filed on Apr. 5, 2013.

BACKGROUND OF THE INVENTION

Definitions: Unless expressly stated otherwise, laser beam, light beam, partial beam or beam does not refer to an idealized beam of geometrical optics, but to a real light beam, such as a laser beam with a Gaussian profile or a modified Gaussian profile or a top-hat profile which does not have an infinitesimally small, but rather an extended beam cross section. Top-hat distribution or top-hat intensity distribution or top-hat profile refers to an intensity distribution that can be described at least in one direction substantially by a rectangular function (rect (x)). Real intensity distributions that deviate from a rectangular function in a percent range or have sloping edges shall also be designated as a top-hat distribution or a top-hat profile.

A device of the aforementioned type is known from DE 10 2007 001 639 A1. In the device described therein, a plurality of laser light sources in multi-mode operation is provided. Their laser beams are intermixed in a rod-shaped homogenizer and superimposed on themselves. They are thereafter converted by collimating and focusing lenses into a linear intensity distribution in a working plane.

Such laser systems with a line focus and a homogeneous intensity distribution are known in the prior art from many technical applications with multi-mode laser sources and are currently in use. The physical reason therefor is that the radiation from multimode lasers can be divided into beams, wherein these beams can be later optically overlapped and mixed or homogenized virtually without any interference fringes. As a result, homogeneous light fields with almost any geometry can be created from multi-mode laser sources. Technically used are in particular rectangular and linear light fields with rectangular top-hat intensity distribution.

It turns out to be problematic that fundamental mode laser are not suitable for the homogenization and overlap described in DE 10 2007 001 639 A1. Fundamental mode laser are currently used in most cases with the familiar point focus. In a few exceptional cases, beam shaping optics is used with fundamental mode lasers, which however operates according to physically principles different from beam shaping optics used with multimode lasers: The radiation of fundamental mode lasers is very coherent, producing strong interference fringes when overlapped with itself. The beam shaping used with fundamental mode lasers is therefore according to the prior art produced by diffraction effects, meaning diffractive or coherent deformation of the wave front.

The problem underlying the present invention is to provide a device of the aforementioned type which can produce a comparatively homogeneous linear intensity distribution in a working plane in spite of the use of fundamental mode lasers.

BRIEF SUMMARY OF THE INVENTION

This is achieved according to the invention with a device of the aforementioned type having the characterizing features of claim 1. The dependent claims relate to preferred embodiments of the invention.

According to claim 1, the laser light sources are formed as fundamental mode lasers, and the device is designed such that each of the laser beams origination from the laser light sources does not overlap with itself. In this way, disturbing interference fringes caused when coherent light overlaps with itself are not generated.

An overlap of the light of the individual fundamental mode lasers with itself an be prevented in particular by eliminating typical multi-lens homogenizers. Such multi-lens homogenizers divide the laser beam into a plurality of partial beams, which are thereafter overlapped on themselves.

The laser light sources may be able to produce laser radiation with a beam quality factor $M^2$ of less than 2.0, especially less than 1.5, preferably less than 1.3, for example, laser radiation with a beam quality factor $M^2$ of 1.05.

Preferably, the laser light sources are each formed as fiber lasers. The fiber laser has in recent years been the fastest growing type of laser in terms of sales and numbers of all varieties of material processing. The fiber laser shows in many applications significant price-performance advantages over traditional solid-state lasers and gas lasers. The fiber laser is characterized by a high beam quality and brilliance and has set new performance records for material processing. For example, fundamental mode lasers up to 50 kW are commercially available. Owing to the special characteristics of the fiber laser, the design according to the invention makes it possible to advance into new, unprecedented intensity ranges for line focus applications.

The device may be designed in such a way that the linear intensity distribution has in the working plane a ratio of length to width of greater than 10, in particular greater than 20, preferably greater than 30. Linear intensity distributions with a large aspect ratio are of particular interest for many applications.

The device may be constructed such that laser beams exiting from the individual laser light sources in the working plane are in the longitudinal direction of the line arranged substantially adjacent to one another and together form the linear intensity distribution, wherein in particular only the lateral flanks of the intensity distributions of the individual laser radiations overlap in the longitudinal direction of the line. This prevents an undesirable overlap of the laser beams in the formation of the line.

The optical means may include collimating and/or imaging lenses.

Furthermore, the optical means may include at least one transformation component capable of transforming a Gaussian distribution into a top-hat distribution, wherein the transformation component may, for example, be or include a Powell lens.

In particular, the device may comprise a plurality of transformation components, with each of the transformation components being associated with a respective one of the laser light sources, such that the laser radiation exiting from a first laser light source passes through a first transformation component and the laser radiation exiting from a second laser light source passes through a second transformation component. In this way, relatively rectangular intensity distributions can abut each other in the working plane, thus producing a very uniform line.

Here, the transformation component or each of the transformation components may further homogenize by way of this transformation the so-transformed laser radiation without overlapping the respective laser radiation with itself. This occurs in particular because the transformation component or each of the transformation components redistributes in the energy of the laser radiation like a phase plate without creating an overlap. An overlap occurs only between the adjacent relatively rectangular intensity distributions, which abut each other in the working plane. But these intensity distributions are not mutually coherent, so that no disturbing interference fringes arise from their overlap.

The device may include ferrules for the ends of the fiber lasers or for the optical fibers connected to the fiber lasers, wherein the ferrules associated with the individual laser light sources are preferably connected together in at least one common, in particular heat-dissipating holder. The laser light sources can be operated at very high power due to the heat-dissipating supports. To increase the length of the line, several of these holders can be connected with each other in the longitudinal direction of the line.

Furthermore, the optical means may also include at least one holder which is in particular designed to dissipate heat. Here, too, the at least one heat-dissipating holder ensures that the laser light sources can be operated at very high power levels.

Moreover, the at least one holder of the ferrules and the at least one holder of the optics means may be connected with one another to form at least one module. In particular, the device may include several modules that include the holders, which can be connected with one another in modular form, in particular in the longitudinal direction of the intensity distribution to be produced. The length of the line can also be increased in this manner.

BRIEF DESCRIPTION OF THE DRAWINGS

Additional features and advantages of the present invention will become apparent from the following description of preferred exemplary embodiments with reference to the appended drawings, which show in.

DETAILED DESCRIPTION OF THE INVENTION

In the figures, identical or functionally identical parts or light beams are indicated with the same reference symbols. Furthermore, a coordinate system is indicated in some of the figures to facilitate the orientation.

Figure 1:
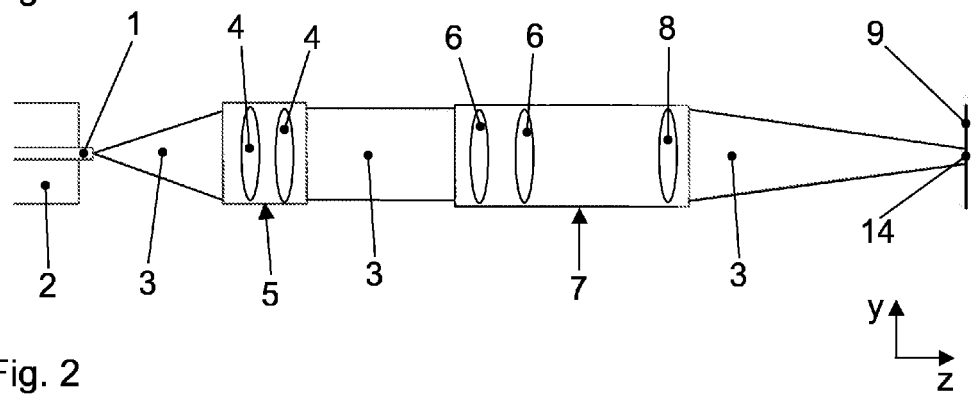
FIG. 1 a schematic side view of a first embodiment of a device according to the invention.

The first embodiment illustrated in FIG. 1 includes a plurality of laser light sources designed as fundamental-mode lasers. In particular, the laser light sources are fiber lasers. FIG. 1 illustrates the end of an optical fiber 1 which is either part of a fiber laser or is connected thereto. The optical fiber 1 is a fundamental-mode fiber. The laser light sources and/or the exit-side ends of the optical fiber 1 in FIG. 1 are arranged side-by-side in the X-direction which extends in the drawing plane.

A heat-conductive and thermally optimized ferrule is arranged at the end of each of the optical fibers 1. In particular, the ferrules of several optical fibers 1 are accommodated in a common holder 2 that is likewise constructed to be heat-conductive and thermally optimized. Several of these holders 2 can be juxtaposed linearly in the X-direction and in particular interconnected, so that the linear arrangement of the fiber ends can be extended to an arbitrary total length. Furthermore, the holders can absorb stray light 2.

Optical means are arranged in the propagation direction Z of the laser beams 3 emerging from the ends of the optical which in the first exemplary embodiment include at least one collimating lens means 4, in particular at least one collimating lens array. This at least one lens array can be designed as a telescope with mutually linearly opposing lenses having apertures that are each centered on the fiber core center of an associated optical fiber 1. The light emerging from the fiber end is collimated by the associated, or opposite, telescope.

The device further includes at least one heat-dissipating holder 5 for the at least one collimating lens means 4. This holder 5 may be made of a heat-conducting and thermally optimized seat that supports lens means 4 and absorbs stray light.

The first embodiment of the device further includes at least one transformation component 6, in particular at least one lens array capable of converting a Gaussian profile into a top-hat profile. Each of the lenses or opposite lenses in multiple lens arrays can be arranged so that the apertures are each centered on the fiber core center of an associated optical fiber 1.

The first embodiment of the device furthermore includes at least one heat-dissipating holder 7 for the at least one transformation component 6. This at least one holder 7 may be composed of a heat-conducting and thermally optimized seat, which supports the at least one transformation component 6 and absorbs stray light.

The optical means furthermore include at least one focusing lens means 8 or at least one focusing lens array capable of focusing the laser beams 3 in a working plane 9. In the illustrated exemplary embodiment, the at least one focusing lens means 8 is housed in the same holder 7 as the at least one transformation component 6. However, the at least one focusing lens means 8 can also be housed separately or in the holder 4, as is the case in the second in embodiment shown in FIG. 5.

The length of the lens means 4 as well as of the transformation components 6 and the holders 5, 7 is matched to the length of the holders 2 of the fiber ends, so that the holders 2, 5, 7 of opposing fiber ends and lens means 4 as well as of transformation components 6 can be combined into opto-mechanical, thermally coupled units (sub-modules).

The transformation components 6 constructed as lens arrays are composed of linear opposing lenses arranged as an array, which create from each collimated beam a rectangular intensity distribution 10, especially in the working plane 9. The beam profiles resulting from the beams emerging from the individual fiber ends and the associated lenses have lateral flanks 10a with drops in intensity along the long axis (X-direction) such that the lateral flank 10a of an intensity distribution 10 overlaps with the lateral flank 10a of the adjacent intensity distribution 10 to form an uninterruptedly uniform linear intensity distribution 11 of the combined laser beam 14.

Figure 2:
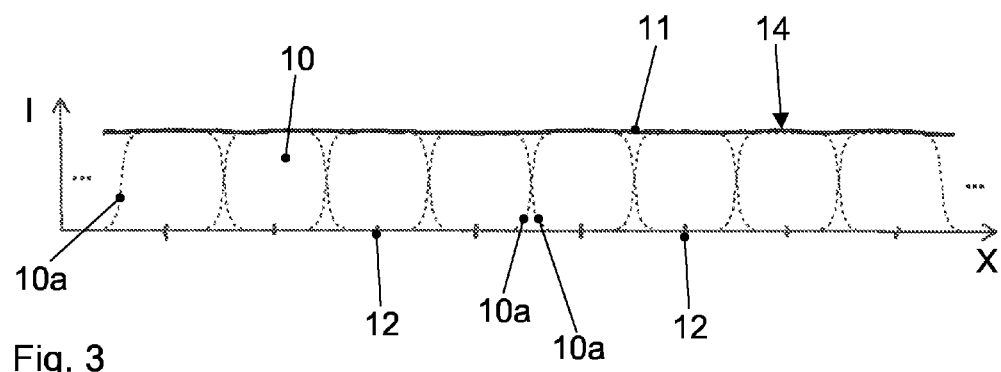
FIG. 2 a schematic diagram illustrating for the first embodiment with respect to the longitudinal direction line the generation of the linear intensity distribution in the working plane.
Figure 3:
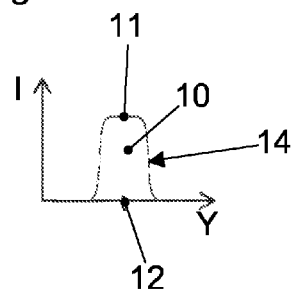
FIG. 3 a schematic diagram illustrating with respect to the transverse direction of the line the generation of the linear intensity distribution in the working plane.

This is illustrated in FIG. 2, where the intensity I in the working plane is plotted along the X-direction, Below the respective intensity distributions 10, the position of the image focus of the fiber ends is designated with 12. In FIG. 3, the intensity I in the working plane is similarly shown along the Y-direction.

Figure 4:
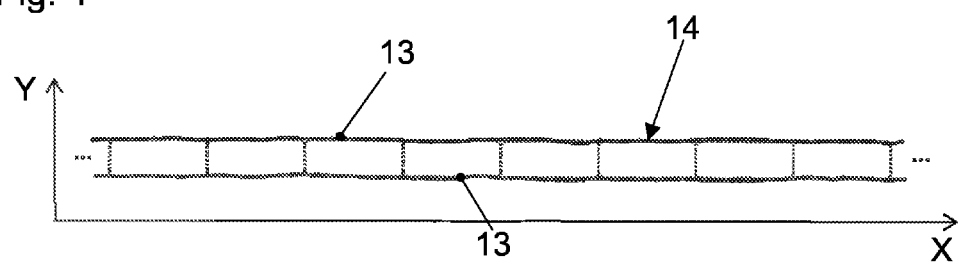
FIG. 4 a schematic diagram showing iso-intensity lines in the working plane.

FIG. 4 shows an iso-intensity line 13 in the working plane 9. The iso-intensity line 13 continues here farther to the right and to the left in FIG. 4, especially when a very long linear intensity distribution 11 is to be created in the longitudinal direction (X-direction) of the line. The iso-intensity line 13 approximates a section through the laser beam 14 in the working plane.

Figure 5:
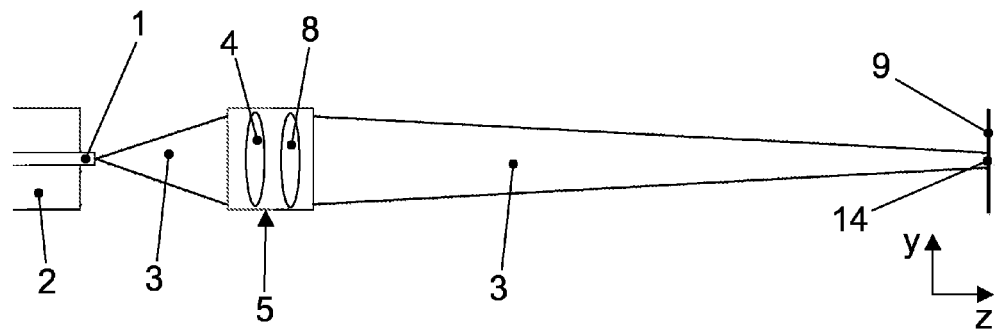
FIG. 5 a schematic side view onto a second embodiment of a device according to the invention.

In the embodiment shown in FIG. 5, a transformation component 6 or lens array for converting a Gaussian profile into a top-hat profile is omitted. The at least one focusing lens means 8 or the at least a focusing lens array can then be accommodated, for example, in the holder 4.

Due to the omission of the transformation component 6 for converting a Gaussian profile into a top-hat profile, the individual intensity profiles 10 in the working plane 9 have a Gaussian shape. Also, the individual intensity profiles 10 overlap in the second embodiment to form an uninterrupted linear intensity distribution 11 of the combined laser beam 14. This uninterrupted linear intensity distribution 11 is non-uniform. However, the intensity variations are tolerable for many applications.

Figure 6:
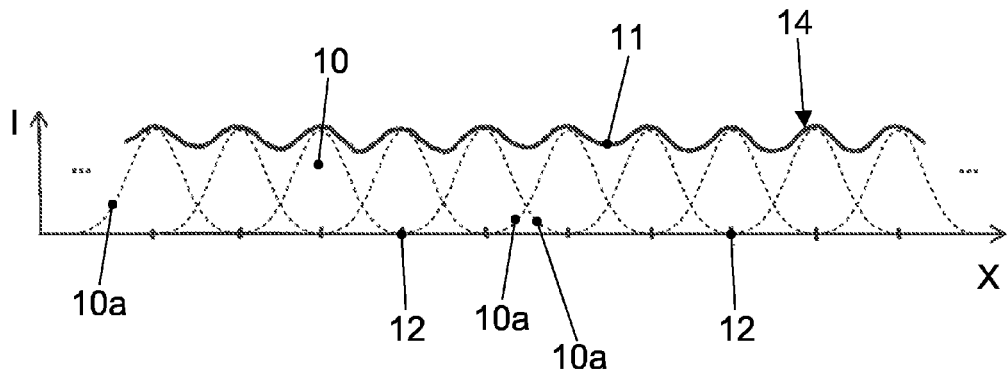
FIG. 6 a schematic diagram showing clearly for the second embodiment with respect to the longitudinal direction of the line the generation of the linear intensity distribution in the working plane.
Figure 7:
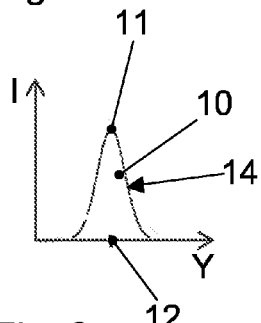
FIG. 7 a schematic diagram showing clearly with respect to the transverse direction of the line the generation of the linear intensity distribution in the working plane.

This is illustrated in FIG. 6, where the intensity I in the working plane is plotted against the X-direction. The position of the image focus of the fiber ends below the respective intensity distributions 10 is again designated with 12. In FIG. 7, the intensity I in the working plane is similarly shown along the Y-direction.

Figure 8:
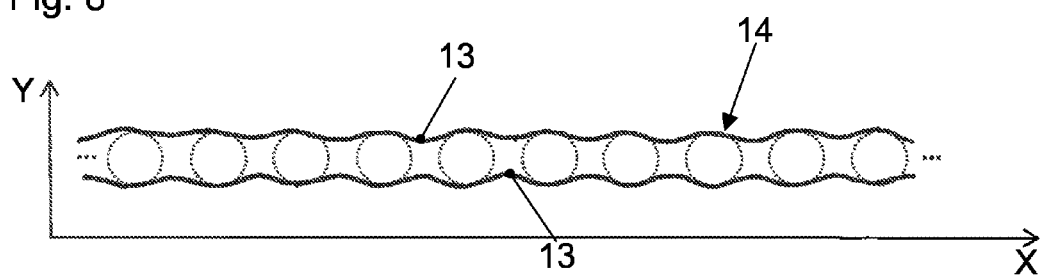
FIG. 8 a schematic diagram showing iso-intensity lines in the working plane.

FIG. 8 again shows an iso-intensity line 13 in the working plane 9. The iso-intensity line 13 continues here farther to the right and to the left in FIG. 8, especially when a very long linear intensity distribution 11 is to be created in the longitudinal direction (X-direction) of the line. The iso-intensity line 13 is also slightly non-uniform due to the Gaussian profile of the individual partial laser beams 3.

In both embodiments, the distance (pitch) of the ferrules in the longitudinal direction X of the line is one of the design parameters, which can be used to adjust the intensity of the line focus to the desired value. The pitch has a lower limit (and the attainable line focus intensity has an upper limit) due to the mechanical stability of the holder, the necessary heat transfer rate, and the minimum aperture size and focal length of the microlenses of collimating array.

EXAMPLE 1

In an exemplary embodiment, commercially available, water-cooled IPG fiber lasers YLR SM, each having a respective power of 1 kW and a beam quality factor of $M^2=1.05$ may be used.

Furthermore, single-mode fibers with a numerical aperture of 0.1 may be used as optical fibers 1.

The minimum focal length of the lens in the lens array may be 0.3 mm. The minimum aperture of the lenses in the lens array may also be 0.3 mm. With these parameters, spot sizes of 0.06 mm can be achieved in the working plane.

The intensity at full illumination of the aperture may be 1.41 $MW/cm^2$. Each rectangular intensity distribution 10 can, for example, extend 2 mm in the long axis (X-direction) and 0.05 mm in the short axis (Y-direction).

A linear power of 0.5 kW/mm and/or a linear intensity of 1000 $kW/cm^2$ can be obtained by juxtaposing the individual intensity distributions 10.

The invention claimed is:

1. A device for generating laser radiation (14) having a linear intensity distribution (11), comprising:
   a plurality of laser light sources for generating laser beams (3), wherein the laser light sources are each formed as fiber lasers, wherein the device comprises ferrules for the ends of the fiber laser or for optical fibers (1) connected to the fiber lasers, and wherein the ferrules associated with the individual laser light sources are connected with one another in several common holders (2),
   an optical device transferring the laser beams (3) emerging from the laser light sources and producing a laser radiation (14) with a linear intensity distribution (11) in a working plane (9), wherein the optical device comprises collimating and/or imaging lenses (4, 8) and at least one holder (5, 7),
   wherein the laser light sources are formed as fundamental mode lasers, and the device is designed such that each of the laser beams (3) emerging from the laser light sources is not overlapped with itself, wherein at least one of the several common holders (2) for the ferrules and the at least one holder (5, 7) of the optical device are connected with each other to form at least one module, and the device comprises a plurality of modules associated with the holders (2, 5, 7) and modularly connectable to each other.

2. The device according to claim 1, wherein the laser light sources generate laser beams (3) having a beam quality factor $M^2$ of less than 2.0.

3. The device according to claim 1, wherein the device is designed in such a way that the linear intensity distribution (11) has in the working plane (9) a ratio of length to width of greater than 10.

4. The device according to claim 1, wherein only the lateral flanks (10a) of the intensity distributions (10) of the individual laser beams (3) overlap in the longitudinal direction (X) of the line.

5. The device according to claim 1, wherein the optical device comprises at least one transformation component (6) transforming a Gaussian distribution into a top-hat distribution.

6. The device according to claim 1, wherein the device comprises a plurality of transformation components (6), with each one of the transformation components (6) being assigned to a respective one of the laser light sources in such a way that the laser beams (3) exiting from a first laser light source pass through a first transformation component (6) and the laser beams (3) exiting from a second laser light source pass through a second transformation component (6).

7. The device according to claim 1, wherein the several common holders (2) are connected with one another in a heat-dissipating fashion.

8. The device according to claim 6, wherein the optical device comprises at least one holder (5, 7) which is designed to be heat-dissipating.

9. The device according to claim 2, wherein the beam quality factor $M^2$ of the laser beams (3) generated by the laser light sources is less than 1.5.

10. The device according to claim 9, wherein the beam quality factor $M^2$ of the laser beams (3) generated by the laser light sources is less than 1.3.

11. The device according to claim 10, wherein the beam quality factor $M^2$ of the laser beams (3) generated by the laser light sources is 1.05.

12. The device according to claim 3, wherein the device is designed in such a way that the linear intensity distribution (11) has in the working plane (9) the ratio of length to width of greater than 20.

13. The device according to claim 11, wherein the device is designed in such a way that the linear intensity distribution (11) has in the working plane (9) the ratio of length to width of greater than 30.

14. The device according to claim 5, wherein the transformation component (6) comprises a Powell lens.

15. The device according to claim 1, wherein the plurality of the modules comprising the holders (2, 5, 7) are interconnectable in a modular fashion in the longitudinal direction (X) of the intensity distribution (11) to be generated.

16. The device according to claim 1, wherein the device is designed such that each of the laser beams (3) emerging from the laser light sources is not overlapped with itself in a region from where each of the laser beams (3) emerges from the laser light sources and extending to the working plane (9).

* * * * *

UNITED STATES PATENT AND TRADEMARK OFFICE
CERTIFICATE OF CORRECTION

PATENT NO. : 9,547,176 B2
APPLICATION NO. : 14/782239
DATED : January 17, 2017
INVENTOR(S) : Lissotschenko et al.

It is certified that error appears in the above-identified patent and that said Letters Patent is hereby corrected as shown below:

In the Claims

Column 7, Claim 13, Line 1, change "11" to --12--.

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*